April 28, 1964
N. W. GALLAWAY
3,130,601
AUTOMATIC COUNTERBALANCE FOR PUMPING UNIT
INCLUDING HYDRAULIC BRAKE
Filed June 25, 1962
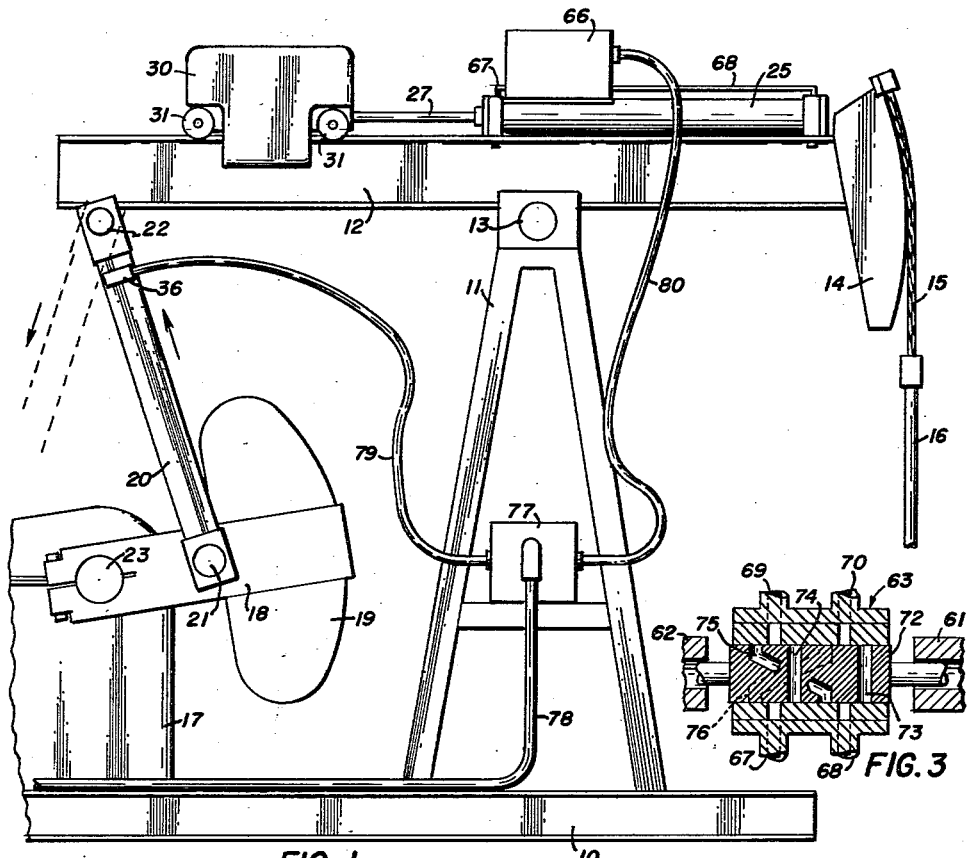
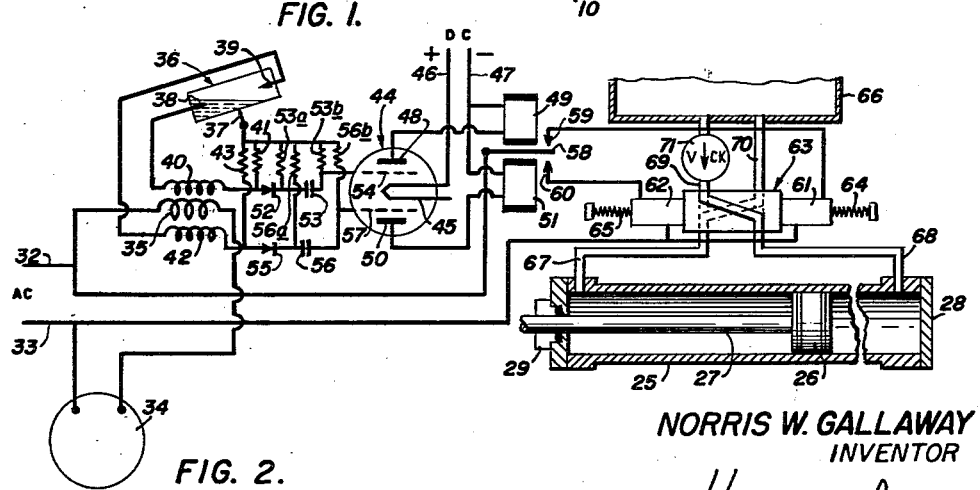
NORRIS W. GALLAWAY
INVENTOR
BY
ATTORNEY United States Patent Office 3,130,601
Patented Apr. 28, 1964

3,130,601
AUTOMATIC COUNTERBALANCE FOR PUMPING UNIT INCLUDING HYDRAULIC BRAKE
Norris W. Gallaway, Fort Worth, Tex., assignor to American Manufacturing Company of Texas, Fort Worth, Tex., a corporation of Texas
Filed June 25, 1962, Ser. No. 204,954
3 Claims. (Cl. 74—590)

This invention relates to well pumping units and has reference to automatic counterbalances. Particularly, the invention has reference to improvements in automatic controls such as shown and described in prior U.S. Patents Nos. 2,915,919 and 2,995,048 which issued December 8, 1959, and August 8, 1961, respectively. The construction of the referred to patents includes a longitudinally movable auxiliary counterweight on a walking beam and actuated by a reversible electric motor and screw shaft. While the patented construction is highly effective for its intended purpose, as a matter of engineering design, it has been found that recirculating ball bearing screw shafts are desirable, but they are expensive, and represent considerable capital investment. Accordingly, an object of the invention is to provide relatively inexpensive automatic counterbalance control means for pumping units of the walking beam type.

Another object is to provide automatic counterbalance control means for pumping units of the walking beam type wherein a mercury switch is located to automatically operate between the extremes of the polished rod stroke.

A further object is to provide hydraulic control means, operable in part by gravity, for shifting an auxiliary counterweight on a pumping unit walking beam.

In conventional pumping units counterweights are manually adjusted so that the effective counterbalance is equal to the weight of the rods (sucker rod string) plus one-half of the weight of the fluid column raised by the rods. Approximately the same amount of power is required for the up and down strokes of the polished rod and thereby a minimum amount of power is required. Thus, a minimum capital investment is required in speed reducers and prime movers. However, down hole conditions change from time to time and the weight of the column of fluid raised varies. In the present invention, as in the construction of the referred to prior patents, auxiliary counterweights are employed to maintain the optimum counterbalance effect.

In the accompanying drawing:

FIGURE 1 is a side elevational view of a conventional pumping unit of the walking beam type and showing the present invention adapted thereto.

FIGURE 2 is a schematic view including a wiring diagram of circuits for controlling a hydraulically operated auxiliary counterweight positioner.

FIGURE 3 is a fragmentary longitudinal sectional view of a solenoid operated four way valve employed in a preferred form of the invention.

The conventional pumping unit shown includes a base frame 10, a Samson post 11 thereon, a walking beam 12 mounted on a saddle bearing 13 atop the Samson post, a mule head 14 on one end of the walking beam, and a bridle 15 and polished rod 16, which rod is the uppermost rod of a sucker rod string. Also in accordance with conventional constructions there is a speed reducer 17 mounted on the base frame 10, a crank 18 mounted on and rotated by the speed reducer, a counterweight 19 on the crank, and a pitman 20 connected between the crank and walking beam by means of a crank wrist pin 21 and tail bearing 22, respectively. The speed reducer crank shaft 23 is beneath the tail bearing 22 and whereby the angularity of the pitman 20 with reference to the crank 18 is the same on either side of the crank shaft.

In accordance with the present invention, there is a cylinder 25 mounted on the walking beam 12 near the mule head 14, and which cylinder has a piston 26 therein and a rearwardly extending piston rod 27. The forward end of the cylinder 25 is closed, as at 28, and the rearward end is provided with a stuffing box 29 to accommodate the piston rod 27.

An auxiliary counterweight 30 is mounted for longitudinal movement on the walking beam 12 and is connected with the extending end of the piston rod 27. Rollers 31 are mounted on the auxiliary counterweight 30 for making rolling contact with the top of the walking beam 12.

Power lines 32 and 33 are wired to and provide electrical current for an electric motor 34 which reciprocates the walking beam 12 through the pitman 20, crank 18 and speed reducer 17. A primary sensing coil 35 is wired in series with the motor 34. Attached to the pitman 20 is a single pole double throw mercury type switch 36 which has a base contact 37 in continuous electrical engagement with the liquid mercury within the switch 36, and rear and forward tilt contacts 38 and 39 are positioned for alternate electrical contact with the mercury within the switch 36 according to the tilt of the pitman 20. A first secondary coil 40 is positioned adjacent the primary coil 35 and is electrically connected at one of its ends to the rear tilt contact point 38 of the switch 36; the other end of the first secondary coil is wired to the base contact 37 of the switch 36 through a first bypass resistor 41; in like manner, a second secondary coil is electrically connected at one of its ends to the forward tilt contact point 39 of the switch 36 and is positioned adjacent the primary coil 35; the other end of the second secondary coil 42 is wired to the base contact 37 of the switch 36 through a second bypass resistor 43.

A dual triode 44 has its single anode 45 electrically connected to the positive terminal 46 of a D.C. power source (not shown). The negative terminal 47 of the D.C. power source is electrically connected to the first plate 48 of the dual triode 44 through a first relay coil 49. Similarly, the second plate 50 of the dual triode 44 is electrically connected to the negative terminal 47 of the D.C. power source through a second relay coil 51. The anode end of a first diode 52 is electrically connected to the junction of the first secondary coil 40 with the first bypass resistor 41 and the cathode end of that diode is electrically connected to one side of a first condenser 53 having its other side electrically connected to the first grid 54 of the dual triode 44. Bleeder resistors 53a and 53b electrically connect opposite sides of the first condenser 53 with the base contact 37 of the switch 36. The anode end of a second diode 55 is electrically connected to the junction of the second secondary coil 42 with the second bypass resistor 43, and the cathode end of that diode is electrically connected to one side of a second condenser 56 having its other side connected to the second grid 57 of the dual triode 44. Bleeder resistors 56a and 56b electrically connect opposite sides of the second condenser 56 to the base contact 37 of the switch 36.

The relay coils 49 and 51 are positioned in opposed relationship at opposite sides of a relay armature 58 electrically connected to the first power line 32. First and second contact points 59 and 60 of the armature 58 are respectively wired to opposed solenoids 61 and 62 in operative engagement with a crossover valve 63; opposed springs 64 and 65 urge the crossover valve 63 to a neutral position in the absence of operation of either of the solenoids 61 or 62. A reservoir 66 is externally mounted on the cylinder 25 above the Samson post 11 and is filled with hydraulic fluid. Rear and forward cylinder lines 67 and 68 respectively communicate the rear and forward ends of the cylinder 25 with orifices (to be described) in the crossover valve 63. Rear and forward reservoir lines 69 and 70 respectively communicate the interior of the reservoir 66 with orifices (to be described) in the crossover valve 63. The rear reservoir line 69 is provided with a check valve 71 which permits hydraulic fluid to flow in only one direction through that line.

With particular reference to FIGURE 3 of the drawing, a longitudinally slidable valve body 72 is positioned within the crossover valve 63 and is provided with a plurality of orifices adapted to permit the flow of hydraulic fluid from the reservoir 66 and through the check valve 71 to either end of the cylinder 25 selectively or to obstruct all communication between the reservoir 66 and the cylinder 25. The neutral position of the valve body 72 which obstructs all flow of hydraulic fluid through the crossover valve 63 is shown in FIGURE 3. A pair of vertical conduits 73 and 74 are provided through the valve body 72 at positions therein such that when the valve body is moved rearwardly with respect to the walking beam 12 the forwardmost conduit 73 communicates the forward reservoir line 70, and the other vertical conduit 74 simultaneously communicates the rear cylinder line 67 with the rear reservoir line 69. Diagonal conduits 75 and 76 are formed through the valve body 72 and are located at positions therein such that when the valve body is moved forwardly with respect to the walking beam 12 the rear reservoir line 69 is communicated with the forward cylinder line 68 and the forward reservoir line 70 is communicated with the rear cylinder line 67.

As a matter of convenience, the solenoids 61 and 62 and crossover valve 63 are mounted within the reservoir 66 itself. All other electrical components except the motor 34 and mercury switch 36 may be mounted within a single weatherproof chassis 77 which may be attached to the Samson post for accessibility. Electrical cables 78, 79 and 80 provided with suitable weatherproof sheathing may be used to interconnect the described electrical components of the invention.

In operation, the piston 26 and cylinder 25 act as a brake rather than a drive member to appropriately locate the auxiliary counterweight 30 upon the walking beam 12. Because the walking beam reciprocates upon the saddle bearing 13 the auxiliary counterweight 30 is forwardly urged by gravity for one-half of the pumping cycle and is rearwardly urged for the other half. The rollers 31 on the auxiliary counterweight 30 would permit the auxiliary counterweight to migrate freely upon the walking beam were it not for attachment of the auxiliary counterweight to the piston 26. It is thus seen that appropriate circulation of hydraulic fluid between opposite ends of the cylinder 25 can be used in conjunction with gravity to adjust the position of the auxiliary counterweight on the walking beam. The correct position of the auxiliary counterweight is defined as that position which minimizes the work required in pumping and may be further defined as that position which equalizes work expended during an upstroke with work expended during a downstroke. It should be noted that the pitman 20 is vertically disposed between the wrist pin 21 and tail bearing 22 at the beginning and end of each stroke and that the mercury switch 36 is tilted toward either of its tilt contact points 38 or 39 at all times except when the pitman 20 is vertically disposed. Thence, mercury within the switch 36 electrically connects the base contact 37 with one of the tilt contacts 38 or 39 during either the upstroke or the downstroke of the polished rod 16 and with the other tilt contact during the opposite stroke. During reciprocation of the walking beam 12 the mercury switch 36 alternately completes the circuits of the first and second secondary coils 40 and 42 so that the alternating fields of the primary coil 35 induce electrical currents in first one secondary coil and then the other. The first and second bypass resistors 41 and 43 respectively provide dummy loads for the circuits of the first and second secondary coils 40 and 42 and the first and second diodes 52 and 55 rectify these respective currents for accumulation of charges in the first and second condensers 53 and 56. The bleeder resistors 53a, 53b, 56a and 56b control the rates at which the condensers 53 and 56 are charged and discharged. The condensers 53 and 56, in turn, determine the charges carried by the grids 54 and 57 of the dual triode 44 and, consequently, control the flow of current from the anode 45 to the plates 48 and 50 and through the relay coils 49 and 51.

If, for an extended period of time, work expended during the upstroke of the pump exceeds that expended during the downstroke, then the condenser 56 will have accumulated a greater charge than condenser 53 and the plate currents of the dual triode will be unequal; therefore, one of the relay coils 51 will have a greater attraction for the armature 58 than the other relay coil 49, and the circuit of one of the solenoids 62 will be completed by attraction of the armature 58 to one of its contact points 60. The actuated solenoid 62 will urge the valve body 72 from its neutral position against the bias pressure of the springs 64 and 65. If, for instance, more work is being expended on the downstroke of the polished rod 16 then the valve body will be urged forwardly so that hydraulic fluid may be drawn from the reservoir 66 through the rear reservoir line 69 and check valve 71 into the diagonal conduit 75 and thence through the forward cylinder line 67 into the forward portion of the cylinder 25; fluid is then also permitted to flow from the rear part of the cylinder through the rear cylinder line 67, conduit 76 and forward reservoir line 70 into the reservoir. As the crank 18 and pitman 20 approach their lowest positions, gravity will urge the auxiliary counterbalance 30 to migrate upon its rollers 31 rearwardly along the walking beam 12 and correct the described unbalance. As the crank 18 and pitman 20 approach their highest positions, the check valve 71 prevents forward motion of the piston 26 within the cylinder 25 and no forward adjustment of the auxiliary counterbalance is made. Construction of the crossover valve 63 with small orifices or conduits can limit the rate of flow of hydraulic fluid therethrough and assure gradual adjustment of the position of the auxiliary counterweight 30. As the auxiliary counterweight adjustment is made, work expended during opposite strokes tends to equalize, and the charges carried by the condensers 53 and 56 also tend to equalize as the excess of the larger is dissipated through the bleeder resistors 53a and 53b or 56a and 56b. Upon an equalization of charges carried by the grids 54 and 57 of the dual triode 44 the excess of current through one of the relay coils 49 or 51 is lost and return of the relay armature 58 to a neutral position breaks the circuit of the previously active solenoid. The biasing springs 64 and 65 then return the valve body to its neutral position as illustrated in FIGURE 3 and flow of hydraulic fluid through the rear and forward cylinder lines 67 and 68 is blocked.

The invention is not limited to the construction herein shown and described, but may be made in various ways within the scope of the appended claims.

What is claimed is:

1. In a pumping unit including a walking beam, a longitudinally movable counterweight on said walking beam, an electric motor, and means including a pitman connecting said motor with said walking beam, hydraulic braking means mounted on said walking beam for restraining the movement of said counterweight, a current transformer including a primary coil positioned to sense input current to said motor, a double throw rocker type switch having a shiftable contact coactive with said pitman, a first secondary coil in said transformer wired in series with a second contact of said switch, a first condenser responsive to the flow of current through said first secondary coil, a second secondary coil in said transformer wired in series with the remaining contact of said switch, a second condenser responsive to the flow of current through said second secondary coil, means responsive to a difference in charges of said condensers releasing said braking means, and means responsive to said last said means determining the direction of travel of said counterweight.

2. In a pumping unit as defined in claim 1, the construction wherein:

said hydraulic braking means includes a cylinder mounted on said walking beam and parallel with the length thereof, a piston within said cylinder, a piston rod connecting said piston with said movable counterweight, and reservoir means supplying fluid to both ends of said cylinder.

3. In a pumping unit as defined in claim 1, the construction wherein:

said double throw rocker type switch is comprised of a mercury switch transversely mounted on said pitman.

References Cited in the file of this patent

UNITED STATES PATENTS

| | | |
|---|---|---|
| 2,915,919 | Mitchell et al. | Dec. 8, 1959 |
| 2,940,335 | Mitchell | June 14, 1960 |
| 2,995,048 | Mitchell et al. | Aug. 8, 1961 |
| 3,016,767 | Egan et al. | Jan. 16, 1962 |